June 24, 1969   A. FOWLER ET AL   3,451,236
CONTROL FOR PRESS BRAKE
Filed Aug. 22, 1967   Sheet 1 of 3
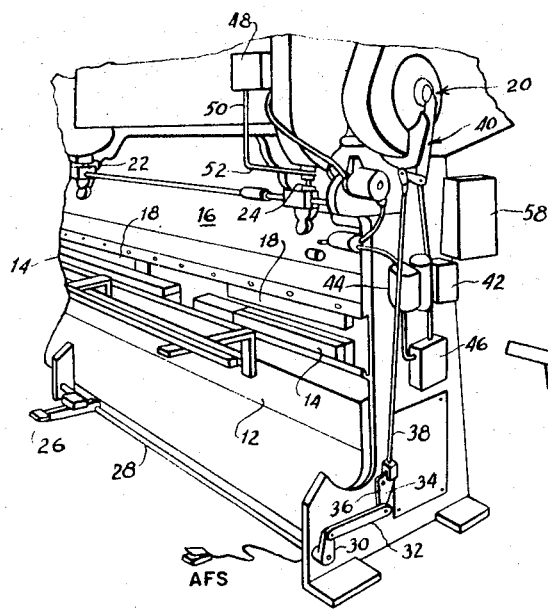
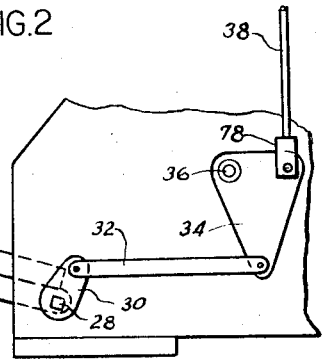
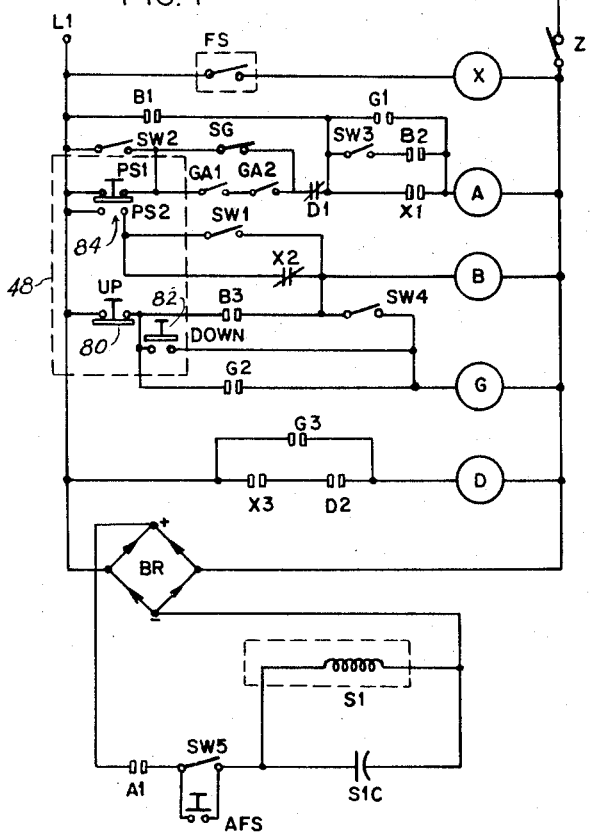
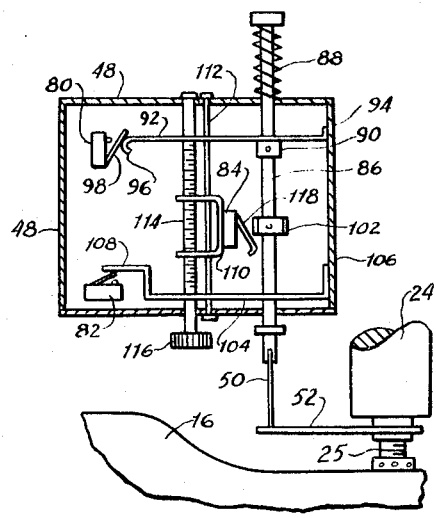
*INVENTORS*
ALEXANDER FOWLER
EVELYN R. FOWLER
BY *James and Franklin*
ATTORNEYS

INVENTORS
ALEXANDER FOWLER
EVELYN R. FOWLER

BY

ATTORNEYS

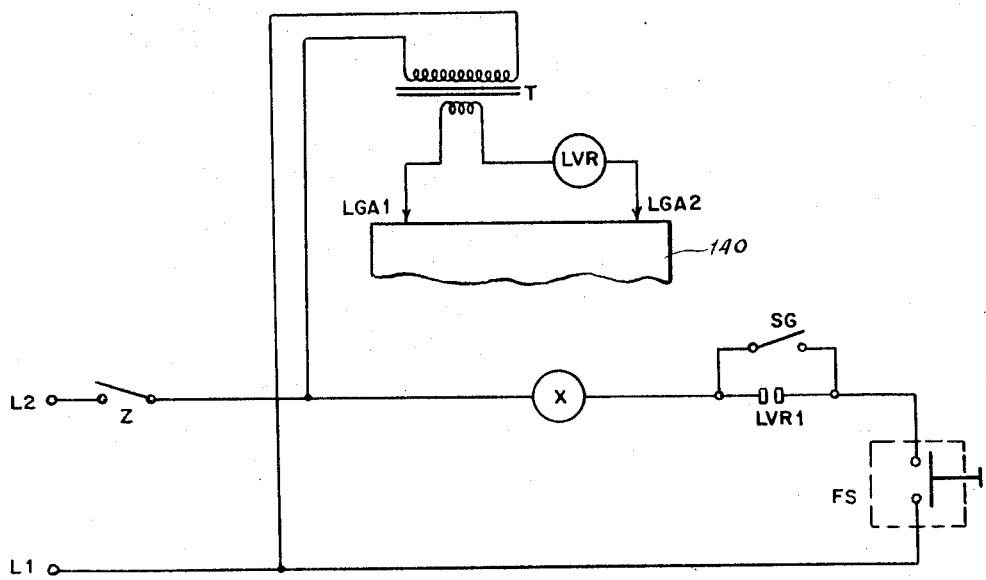
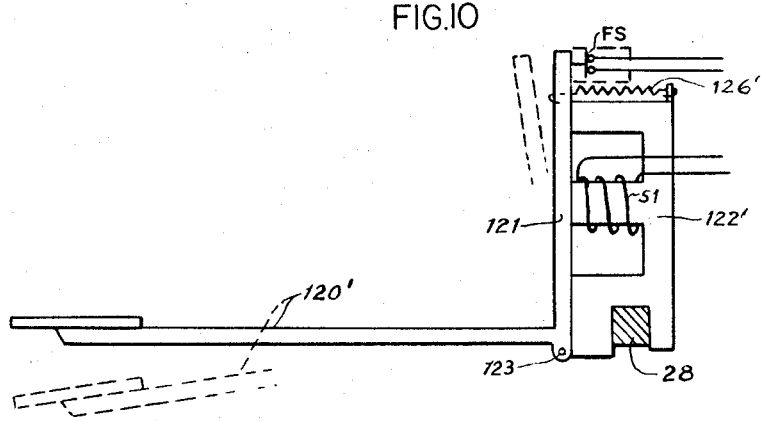

United States Patent Office 3,451,236
Patented June 24, 1969

3,451,236
CONTROL FOR PRESS BRAKE
Alexander Fowler and Evelyn R. Fowler, both of 334 Westover Road, Stamford, Conn. 06902
Filed Aug. 22, 1967, Ser. No. 662,422
Int. Cl. B30b *15/16;* B21j *7/22;* B21d *37/02*
U.S. Cl. 72—25                    14 Claims

ABSTRACT OF THE DISCLOSURE

A control is provided for a press brake having a continuously running driving shaft, a driven shaft running intermittently, a bed, a ram, and a friction clutch engageable to cause said shafts to move said ram toward said bed and back again. There is an up limit switch for non-repeat, and a treadle linkage to variably engage the clutch when slippage is wanted. The treadle linkage includes an electromagnet on one part and an armature on an adjacent part so related that the linkage is mechanically operative only when the magnet coil is energized. The coil is deenergized by operation of said limit switch. In preferred form a preset limit switch is available to take effect when the die reaches the work, and it too deenergizes the coil.

BACKGROUND OF THE INVENTION

Fowler Patent 2,840,135, issued June 24, 1958, concerns mechanically driven press brakes, in which a high speed shaft and a friction clutch (not a one-revolution clutch) are geared through reduction gearing to a slower speed shaft driving pitman mechanism connected to a ram which moves toward and away from a stationary bed. The operator depresses a foot switch to engage the clutch, thus bringing the ram down to the work, whereupon the foot switch may be released and again depressed to gradually and safely bend a piece of sheet metal.

A top limit switch stops the press when the ram reaches the top of its stroke. At the end of its down stroke the engagement of the clutch is changed from slip to full until the ram has been raised to top position where the clutch is disengaged. Thus the ram moves downward and returns upward at full speed when it is not working, but during its working time it moves at slow speed, thereby eliminating whipping, kinking, and safety hazard.

In said Patent 2,840,135 the actuation of the clutch is accomplished by the pull of a solenoid or a pneumatic or hydraulic cylinder. Because this pull is accomplished by movement for a fixed distance, it does not allow for clutch wear and/or brake wear. Also, under some conditions as when bending four flanges to form a large box or cover, it is desirable to effect the bending at a variable rate to suit the operator. To do this, he operates the clutch by means of the foot treadle rather than automatically by means of the patented control. Another type of operation requiring human skill and judgment is encountered when two dies are mounted in the ram of the press brake, and two operators work together, with one controlling the movement of the ram. Accurate top stop at the correct point is important because otherwise there may not be sufficient opening between the dies to remove the piece which has been bent, or if the ram stops before it reaches dead center, then when the next stroke is to be taken, the clutch must overcome the great weight of the ram, thus causing excessive wear of the clutch.

SUMMARY OF THE INVENTION

The purpose of the invention is to maintain the advantages of the press brake control outlined in the said Patent 2,840,135, but to retain clutch control by foot treadle, and to simplify it so that non-skilled operators can use it with speed and safety. There is also greater safety in respect to non-repeat.

As before there is an up limit switch for non-repeat, but there is a treadle linkage to engage the clutch, and the treadle linkage includes an electromagnet on one part and an armature on an adjacent part so related that the linkage is mechanically operative only when the magnet coil is energized. The coil is deenergized by operation of said limit switch. The system may also include a down limit switch, and a preset limit switch to take effect approximately when the die reaches the work. There is another switch actuated by engagement of the magnet and armature, and means such as a light spring tending to cause such engagement but with a force insufficient to operate the clutch. The said linkage switch prepares the circuitry for the next operation of the treadle.

The foregoing and additional features are described in the following detailed specification, which is accompanied by drawings in which:

FIG. 1 is a perspective view showing a typical press brake equipped with the control mechanism of my invention;

FIG. 2 is an elevation drawn to larger scale and showing some of the clutch operating treadle linkage;

FIG. 3 is a diagrammatic view showing limit switches one or more of which form a part of my improvement;

FIG. 4 is a wiring diagram for the apparatus shown in FIGS. 1, 2 and 3;

FIG. 9 is an electrical diagram showing another way in which the operation may be made dependent on proper initial positioning of the work in the press; and FIG. 10 shows a modified treadle arrangement which may be used in lieu of that shown in FIG. 6.

Figure 5:
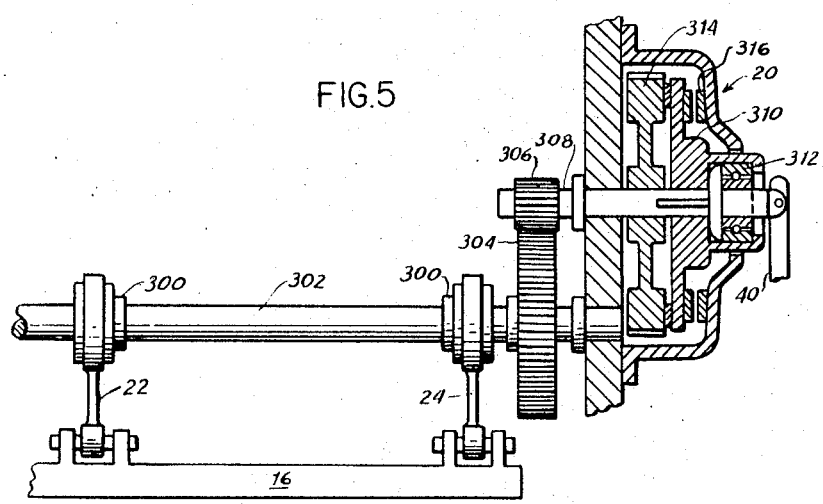
FIG. 5 is a schematic view explanatory of a conventional drive for a press brake.

Referring to the drawing, and more particularly to FIG. 1, the machine there shown is a conventional press brake. It comprises a driving shaft carrying a flywheel (not shown) and running continuously at uniform speed. There is a stationary bed 12 carrying appropriate lower tool or die elements 14, and a movable ram 16 carrying appropriate upper tool or die elements 18. Each end of the ram is supported by a pitman. In the present case these are located generally at 22 and 24.

A friction clutch generally designated 20 causes the drive shaft to move the pitmans and ram 16 toward the bed 12 and back again. The clutch 20 is ordinarily and preferably part of a clutch-brake assembly, and both the clutch and brake are frictional and operate in alternation. For simplicity the clutch only of the clutch-brake assembly will be referred to, and "engagement" or "disengagement" will apply to the clutch surfaces.

Referring to FIG. 5, the pitmans at 22, 24 are simultaneously moved by eccentrics 300 carried on a shaft 302. This is driven by a gear 304 meshing with a pinion 306 carried on a shaft 308 splined to a friction disc 310 forming the axially movable part of the clutch-brake 20. Disc 310 is moved axially by lever 40 acting through an antifriction bearing 312. When moved to the left, it frictionally engages a flywheel 314, which may also act as a gear which is continuously driven by the driving motor, not shown. When disc 310 is moved to the right, it frictionally engages a stationary brake surface 316.

The regular foot treadle for controlling the press brake is shown at 26 in FIGS. 1 and 2. This turns a rod 28 moving an arm 30 which pulls a link 32 connected to an angle lever 34 pivoted at 36 and connected through an upright link 38 to the control lever systems 40 (FIG. 1) of the clutch 20. The regular motor controls for the press brake are housed at 42, 44 and 46.

Box 48 (FIG. 1), may be called a limit switch box, and is mounted on a top stationary part of the machine in such a position that it may be conveniently connected as by means of an upright chain or rod 50 and a bracket 52 to the pitman mechanism, in this case at 24. The bracket 52 is preferably connected above the usual adjustable screw forming a part of the pitman.

A main control panel at 58 contains the circuitry of my invention other than the limit switches in box 48 and a linkage switch described later.

Referring now to FIG. 3, the limit switch box 48 has a rod 86 connected by a rod or chain 50 and a bracket 52 to the capstan 24. The latter is connected to one end of ram 16 by the usual adjustable capstan screw 25.

There are three limit switches in box 48, these being indicated at 80, 82 and 84. The switches are precision over-the-center or snap switches, a commercial example of which is sold under the name "Microswitch." Rod 86 is vertically slidable in box 48 and is normally urged upward by a compression spring 88. The rod 86 has a collar 90 adapted to bear against a movable member 92 secured to box 48 at 94, and the opposite end 96 of which acts as a cam bearing against a leaf spring 98, which in turn bears against the projecting pin of switch 80. The parts are suitably adjusted, as by changing the position of collar 90 on rod 86, or by changing the length of the connection 50, so that limit switch 80 is operated at or near the "up" position of the ram.

The switch 82 is a "down" limit switch, and is operated by another collar 102, adjustably fixed on rod 86. When the ram descends the rod 86 is pulled down until collar 102 bears against an arm 104, which is secured to box 48 at 106, and the opposite end 108 of which bears against and operates the switch 82. Here again I shall for convenience refere to the "down" position of the ram, but the adjustment is approximate in the sense that some may prefer to operate the switch slightly ahead of dead center.

The third switch 84 may be called a "preset stop" switch, and is mounted on a vertically movable yoke 110 which is vertically slidable on a guide rod 112. Its position is adjustable by means of a screw 114, turned by an adjusting knob 116. Switch 84 is operated by collar 102, which rides past a leaf spring 118 and so bears against the operating pin of the switch. The position of switch 84 is adjusted to correspond to a desired point intermediate the "up" and "down" positions, and it usually corresponds to initial engagement of the work by the ram-carried tool or die elements. For simplicity this is here referred to as initial engagement of the work by the ram. The definition is approximate, for some may prefer to adjust the switch to stop the ram just before reaching the work, so that the work may be readjusted just before the die bears on it.

Instead of having the limit switches operated by a vertically slidable rod connected to the ram, as here shown in FIG. 3, it is also possible to provide a cam on the crank shaft (302 in FIG. 5) to operate the limit switches, the switches being adjustable around the shaft, or to provide three cams each independently adjustable on the shaft, and each operating one limit switch. Such an arrangement is preferable in control mechanism designed and built into the press by the manufacturer of the press. However, the vertically slidable rod here shown is more convenient for installations made in the field, or on presses which have already been built.

Figure 6:
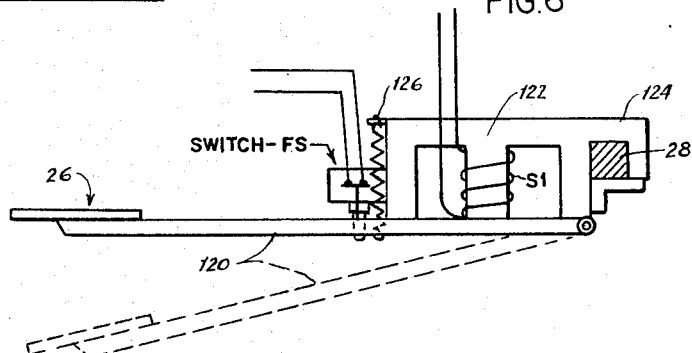
FIG. 6 is explanatory of how the linkage magnet and linkage switch may be applied to the foot treadle.

Referring now to FIG. 6, the treadle assembly includes an electromagnet S1 on one part, and an armature 120 on an adjacent part, so related that the linkage is mechanically operative only when the said magnet or linkage coil S1 is energized. The linkage coil S1 may be deenergized by the aforesaid limit switches. There is also a linkage switch FS which is operated by separation or engagement of armature 120 and magnet core 122. The parts may be engaged lightly by a spring 126, insufficient to operate the clutch.

The wiring diagram for the apparatus as so far described is shown in FIG. 4. This is an across-the-line diagram, with the main lines indicated at L1, L2. Normally open relay contacts are indicated by spaced vertical lines, and normally closed contacts have an added diagonal line. The circles X, A, B, G, and D represent solenoid relay coils, and the contacts operated by these relays are represented by the same letters with the following numbers.

The basic diagram may be simpler than that there shown, for the circuit may be used without certain switches which are added for special purposes, and which may be eliminated, if the ability to readily make certain changes in operation is not desired.

The coil S1 of the linkage magnet is shown near the bottom of the diagram. The linkage switch FS is shown at the top of the diagram. A bridge rectifier BR is employed when it is desired to drive the magnet by direct current. This refinement is not essential, and alternating current may be used. The top of the bridge BR is considered plus, and the bottom minus. A dotted rectangle 48 corresponds to the limit switch box, and houses the three limit switches which are marked "up" (switch 80), and "down" (switch 82), and PS1, PS2 for the preset stop switch (switch 84).

The system enables the operator to set the press brake so that it will automatically stop at the correct point atfer completing each stroke. Also it may stop at some point before it reaches the bottom of each stroke. An additional optional feature is the use of electrical contacts GA1 and GA2 on the gages which will prevent the press brake from operating unless the work piece is properly positioned at the gages. This serves to improve safety, since the ram cannot move unless and until the work is correctly gaged.

The new treadle (FIG. 6) operates the clutch by mechanical means, but is controlled electromagnetically. It consists of a foot plate 120 which is hinged to a body and core 122, having a hook section 124 secured to rod 28. The foot plate 120 is held upward to the body 122 by means of a spring 126 of sufficient force to overcome the weight of the foot plate, but substantially less force than that required to operate the clutch. The normally open switch FS is attached to the body 122, and is closed when the foot plate is held to the body by the spring 126. A counterbalance may be used to return the foot plate, or both a spring and a countrebalance may be used in combination.

When coil S1 is energized from either an AC or preferably a DC source, the foot plate is electromagnetically held against the coil section of the body, and in effect forms one rigid member with the body. When the foot plate 120 is depressed, the press brake rod 28 is rotated and operates the clutch by linkage shown in FIG. 2. When coil S1 is deenergized, and although the foot plate 120 remains in depressed position, the press brake rod 28 returns to its original position because of usual springs in the press brake linkage system, and the body 122 also returns with the rod to its original position. The clutch is released as though the treadle had been released. When foot pressure is taken off the foot plate 120, that too returns to its original position by the pull of spring 126, and this again actuates the switch FS, switch FS is used to prepare the control system to provide energy to the magnet coil S1.

The operation may be described as follows with reference to FIG. 4. The ram is assumed to be at the top of its stroke. Electric power is supplied at L1 and L2 (usually AC), and power switch Z is closed. The main driving motor of the press brake is running.

The limit switches 84, 82 and 80 are set for Preset Stop, Self-Return, and Non-Repeat. SW1 switch is open; SW2 contacts are open; SW3 is open; SW4 is open, and switches SG and SW5 are closed. Slipping is controlled by pressure of the operator's foot on the treadle. When coil S1 is energized the treadle will operate the clutch, but not when coil S1 is deenergized.

The material to be formed, usually sheet metal, is placed in the press brake containing the forming dies. In a bending operation, preset stop switch 84 is set so that the ram (really the die carried thereby) stops at the point of contact with the work, or before. When switches are set as indicated, the operation is as follows: Assume that the ram is at the top of the stroke with foot plate 120 released and its FS switch contacts closed. The operator presses down on the treadle, with the foot plate 120 and body 124 acting as a rigid body because the magnet coil S1 is energized as a result of relay coil X being energized through a circuit starting with line L1 to switch FS, relay coil X-switch Z-and back to line L2. This in turn energizes relay A through circuit from line L1 to contacts PS1, switch SG, contacts D1, contacts X1, relay coil A, switch Z, back to line L2. This then energizes coil S1 through circuit from BR+ relay contacts A1, switch SW5, coil S1, back to BR—. The bridge BR is energized through circuit from line L1 to bridge BR, to switch Z, and back to line L2.

At the preset stop point, contacts PS1 open and contacts PS2 close, and coil S1 is deenergized, and the ram stops because the magnet body 124 (FIG. 6) breaks away from the foot plate 120, releasing the clutch, and opening the treadle contacts FS, which releases relay X. This closes relay contacts X2, energizing relay coil B through a circuit from line L1 to contacts PS2, to relay contacts X2, to relay coil B, switch Z, and back to line L2. Relay B is maintained closed through a circuit from line L1, up switch 80, relay contacts B3, relay coil B, switch Z, and back to line L2.

Upon releasing the foot treadle, its FS contacts close, energizing relay coil X as before, the circuit being from line L1 to switch FS, to relay coil X, switch Z and back to line L2. The treadle is now again depressed, with magnet coil S1 being energized as before, but relay coil A being energized through a circuit from line L1, relay contacts B1, contacts X1, relay coil A, switch Z, and back to line L2. The stroke continues downward and closes down limit switch 82, which energizes relay G through a circuit from line L1, limit switch 80, limit switch 82, relay coil G, switch Z, and back to line L2. It is held closed by a circuit from line L1, limit switch 80, relay contacts G2, relay coil G, switch Z, and back to line L2. Relay D is now energized through a circuit from line L1, relay contacts G3, relay coil D, to switch Z and back to line L2.

With the foot treadle depressed, the ram continues its cycle until it opens the up limit switch 80, which deenergizes relay B and relay G, relay contacts D1 being held open, thereby opening relay A. Opening of contacts A1 deenergizes magnet coil S1, and foot plate 120 breaks away, releasing the clutch and opening the treadle contacts FS, which deenergizes relay coil X, and the opening of contacts X3 deenergizes relay coil D. The operator releases the treadle, causing treadle contacts FS to close, so that the cycle can be repeated.

Variations of the above operation are possible. One such variation is to omit stopping the ram between its initial fast descent, and its slow descent after reaching the work, that is, the preset stop. By closing the switch SW1, it is possible to obtain the above described operation without the preset stop. With the treadle switch contacts FS still closed, the ram continues, down movement at a speed determined by the operator's use of the treadle, without having to release and again depress the treadle when the work is reached.

When switch SW1 is closed the ram does not stop at the preset stop because relay B becomes energized immediately upon tripping of the preset stop switch 84 through a circuit from line L1 to contacts PS2 of the switch 84 to switch SW1 and then on to relay coil B, to switch Z, and back to line L2. This provides current to energize relay B and so to energize relay A and magnet coil S1 as described above.

Capacitor S1C causes an oscillatory discharge through coil S1 and S1C circuit, resulting in quick release of the treadle and less arc across the A1 relay contacts.

The "down" limit switch 82 is tripped preferably at a point about 1/16" before the bottom of the stroke. The ram continues any necessary slight additional movement downward until the material is completely formed, and then upward until the "up" limit switch is tripped.

The finished work may be removed from the press and a new sheet of metal inserted. The cycle may then be repeated.

So far the units GA1 and GA2 in FIG. 4 have not been mentioned, and were assumed to be bypassed by closing of the switch SG. The parts GA1 and GA2 are microswitches which are used in combination with stop gauges which stop the insertion of and which help position the sheet or work when inserted in the press.

Figure 7:
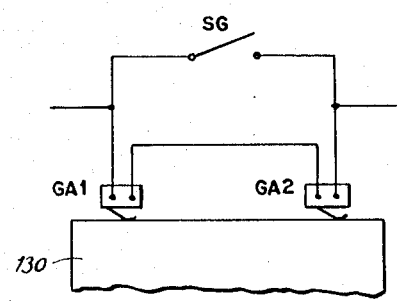
FIG. 7 is a wiring diagram corresponding to a part of FIG. 4, but showing the addition of gauge switches.

Referring now to FIG. 7, the work 130 when inserted engages the limit switches GA1 and GA2 which are connected in series. When these gauge switches are to be used the switch SG is opened. The preset limit switch 84 takes effect before the work sheet is bent enough to leave the microswitches GA1 and GA2.

FIG. 9 shows circuitry which may be used in lieu of that shown in FIG. 7, and in which a relay circuit is established through the work itself. Step down transformer T reduces the line voltage to a safe operating voltage, in a range of from say 6 to 24 volts. The work 140 is inserted and makes contact with a pair of gauges or gauge contacts LGA1 and LGA2, thus completing a circuit through the coil of a relay LVR. When the relay contacts LVR1 close there is a circuit through the coil of relay X. The shunt switch SG is opened when the gauge contacts are to be used, and is closed when they are not to be used. The treadle switch FS and the power switch Z correspond to similar parts in FIGS. 4 and 7.

The circuit shown in FIG. 9 is satisfactory for piercing or other work in which the sheet remains flat. It has a disadvantage when the sheet is bent in that the bending of the sheet may lift the forward edge away from the contacts. In such case the contacts LGA1 and LGA2 may be placed where the microswitches GA1 and GA2 are shown in FIG. 4 of the drawing. The placement in FIG. 4 will operate successfully even if the sheet is later bent away from the contacts.

Conversely, if microswitches GA1 and GA2 (FIGS. 4 and 7) are to be used, and if the sheet is to remain flat, the said microswitches may be located as shown in FIG. 9, that is, they may be located in series with the treadle switch FS and the relay coil X shown at the top of FIG. 4. In such case the disabling switch SG is connected in shut around the mircoswitches GA1 and GA2, and is closed when the microswitches are not to be used.

As so far described the switch SW5 at the bottom of FIG. 4 is assumed to be closed. The switch AFS is an auxiliary foot switch which is made effective by opening the switch SW5. The foot switch AFS may be at the end of a cable as shown in FIG. 1, for use when two operators are working on a single machine. It is a safety switch which must be closed by the second operator to signify that he too is ready, while the first operator makes use of the foot treadle. It will be evident that if the second operator does not close his switch AFS, there will be no supply of current to energize the main magnet S1. If there are three operators, two such auxiliary switches may be connected in series, and so on.

FIG. 10 shows a modification of the treadle arrangement shown in FIG. 6, the essential difference being that the magnet core 122' is generally upright instead of horizontal, and the foot plate 120' has an armature 121 disposed perpendicular to the plate 120'. The treadle switch FS, the pull spring 126', the treadle shaft 28, and the magnet coil S1 correspond to the similarly numbered parts in FIG. 6. In this case the foot plate is pivoted at 123. Compared to the arrangement of FIG. 6, the present arrangement is more compact and fits better on a press having little clearance behind the rod 28. It also requires less spring force at the pull spring 126'.

Figure 8:
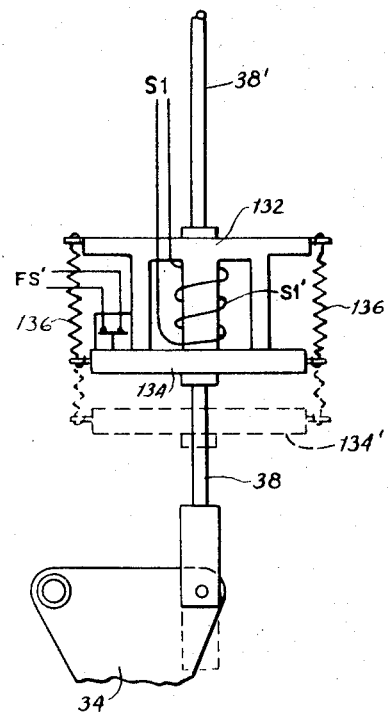
FIG. 8 is explanatory of how the linkage magnet and linkage switch may be applied to the clutch rod instead of the foot treadle.

It is not essential that the magnet coil S1 be applied to the treadle itself as shown in FIGS. 6 and 10. The release may be provided anywhere in the linkage between the foot treadle and the clutch. For example it may be applied to the upright link 38 shown in FIG. 2, and such an arrangement is shown in FIG. 8, in which the link or clutch rod 38 is interrupted by a magnet 132 having a coil S1' operating on an armature 134 secured to the lower part of the rod 38. The magnet 132 is secured to the upper part 38' of the clutch rod. The parts are lightly drawn together by springs 136 which correspond to the spring 126 in FIG. 6. The armature 134 corresponds to part 120 in FIG. 6, and switch contacts FS' correspond to the contacts FS in FIG. 6.

On reflection it will be seen that this arrangement will function exactly as previously described, the rod 38, 38' acting as an integral rod when the coil S1' is energized, but not when the coil is deenergized. The contacts FS open whenever armature 134 is separated from the magnet 132, and close when parts 132 and 134 engage, either by reason of springs 136, which are too light to operate the clutch, or by energization of magnet coil S1', which enables operation of the clutch.

It is believed that the construction and operation of my improved control for a press brake, as well as the advantages thereof, will be apparent from the foregoing detailed description. It will also be apparent that while I have shown and described the invention in preferred forms, changes may be made without departing from the scope of the invention, as sought to be defined in the following claims. In the claims the reference to a treadle linkage switch is not intended to exclude a modification such as that shown in FIG. 8 in which exactly equivalent parts are included in the treadle linkage, although removed somewhat from the treadle tiself. In the claims the reference to a press brake is not intended to exclude use of the new control system for non-repeat on a mechanically driven press or shear.

We claim:

1. A control for a press brake comprising a continuously running driving shaft, a driven shaft running intermittently, a bed, a ram, a friction clutch engageable to cause said shafts to move said ram toward said bed and back again, an up limit switch for non-repeat, and a treadle linkage to engage the clutch, said treadle linkage including an electromagnet on one part and an armature on an adjacent part so related that the linkage is mechanically operative only when the magnet coil is energized, said coil being deenergized by operation of said up limit switch.

2. A control for a press brake as defined in claim 1, in which there is also a preset limit switch to take effect approximately when the die reaches the work, and in which the magnet coil is deenergized by operation of said preset limit switch.

3. A control for a press brake as defined in claim 2, in which there is also a down limit switch and circuitry responsive to operation of said down limit switch to prepare the circuitry to deenergize the magnet coil in response to operation of the up limit switch.

4. A control for a press brake as defined in claim 3, in which the treadle linkage includes a switch which is responsive to engagement of the electromagnet and the armature, said linkage switch being connected in the control circuitry and serving to prepare said circuitry for the next depression of the treadle.

5. A control for a press brake as defined in claim 4, in which there is means tending to move the armature to the magnet and to thereby operate the treadle linkage switch, said means exerting a force which is substantially less than that exerted by the electromagnet and which is insufficient to cause operation of the clutch by means of the treadle.

6. A control for a press brake as defined in claim 5, in which there are gauge switches in series with the treadle linkage switch, to make the latter inoperative until a piece to be worked on has been so inserted in the press as to operate the gauge switches.

7. A control for a press brake as defined in claim 5, in which there is a source of low voltage current, one or more contacts to be engaged by the piece to be worked when it has been properly inserted in the press, and a relay magnet in series with the low voltage source and said contacts, said relay having contacts which are in series with the treadle linkage switch in order to make the latter inoperative until the piece to be worked has been properly inserted in the press.

8. A control for a press brake as defined in claim 1, in which there is also a down limit switch and circuitry responsive to operation of said down limit switch to prepare the circuitry to deenergize the magnet coil in response to operation of the up limit switch.

9. A control for a press brake as defined in claim 1, in which the treadle linkage includes a switch which is responsive to engagement of the electromagnet and the armature, said switch being connected in the control circuitry and serving to prepare said circuitry for the next depression of the treadle.

10. A control for a press brake as defined in claim 9, in which there is means tending to move the armature to the magnet and to thereby operate the treadle linkage switch, said means exerting a force which is substantially less than that exerted by the electromagnet and which is insufficient to cause operation of the clutch by means of the treadle.

11. A control for a press brake as defined in claim 9, in which there are gauge switches in series with the treadle linkage switch, to make the latter inoperative until a piece to be worked on has been so inserted in the press as to operate the gauge switches.

12. A control for a press brake as defined in claim 9, in which there is a source of low voltage current and one or more contacts to be engaged by the piece to be worked when it has been properly inserted in the press, and a relay magnet in series with the low voltage source and said contacts, said relay having contacts which are in series with the treadle linkage switch in order to make the latter inoperative until the piece to be worked has been properly inserted in the press.

13. A control for a press brake as defined in claim 1, in which there is an additional safety switch connected in series with the electromagnet coil for operation by a second operator.

14. A control for a press brake as defined in claim 5, in which there is an additional safety switch connected in series with the electromagnet coil for operation by a second operator.

References Cited
UNITED STATES PATENTS

| | | | |
|---|---|---|---|
| 2,584,534 | 2/1952 | Barnhardston | 72—26 |
| 2,840,135 | 6/1958 | Fowler | 72—26 |

RONALD D. GREFE, *Primary Examiner.*

U.S. Cl. X.R.

72—26, 30, 413